H. G. CUTHBERT.
APPARATUS FOR TEACHING ARITHMETIC.
APPLICATION FILED MAR. 22, 1913.
1,218,931.
Patented Mar. 13, 1917.
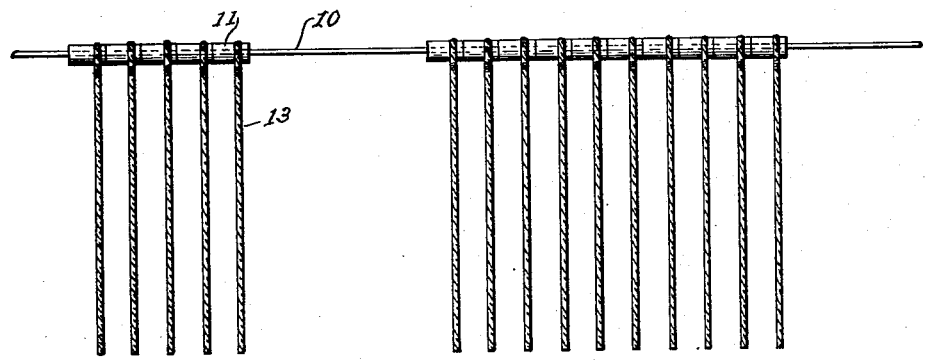
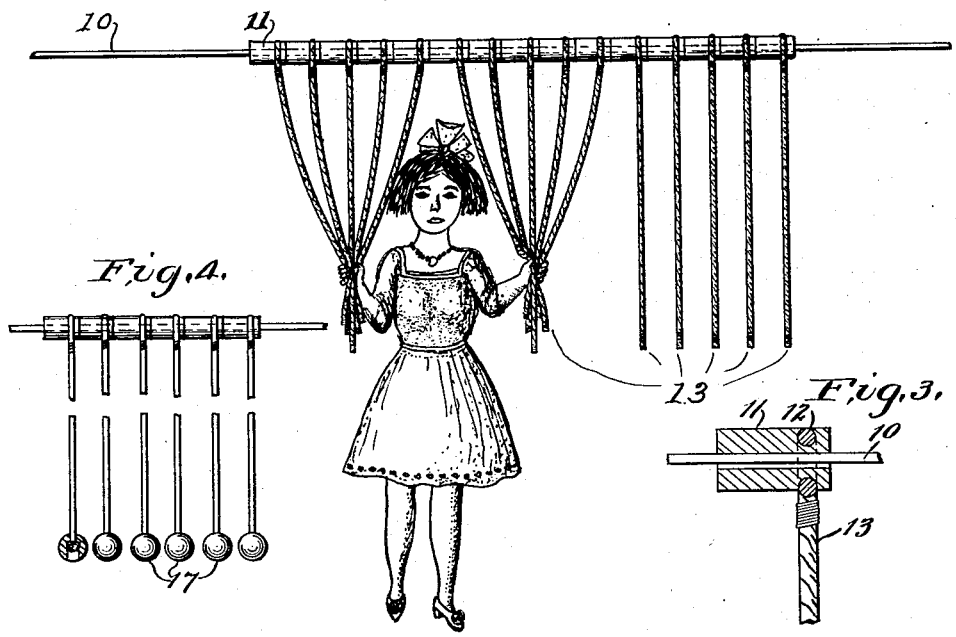

UNITED STATES PATENT OFFICE.

HERMAN G. CUTHBERT, OF NEWARK, NEW JERSEY.

APPARATUS FOR TEACHING ARITHMETIC.

1,218,931.  Specification of Letters Patent.  Patented Mar. 13, 1917.

Application filed March 22, 1913. Serial No. 756,108.

*To all whom it may concern:*

Be it known that I, HERMAN G. CUTHBERT, a citizen of the United States, residing at Newark, in the county of Essex and State of New Jersey, have invented new and useful Improvements in Apparatus for Teaching Arithmetic, of which the following is a specification.

This invention relates to educational appliances and particularly to apparatus for teaching arithmetic.

It is sought to aid the development of the calculative faculty without the distractive necessity for remembering or considering symbols or symbolic elements, thereby enabling the rapid training of very young pupils.

It is an object to provide an apparatus which will be available for teaching computations in addition, multiplication, subtraction and division, in the easiest way, assisting the mind objectively at every stage in such mental operations; aiding in concentrating the attention of the pupil and enabling the sustentation of quantitative conceptions with ease. That is to say, when the apparatus is used to demonstrate a combination of certain numbers, the units in the combination will be objectively apparent at all times, none of the objective units being hidden at any time, although they may be so associated as to suggest a concrete number.

A further object is to give an apparatus including counters adapted to be grasped in considerable number by the pupil with a minimum of difficulty, without liability of their being dropped and without requiring distracting movements on the part of the pupil in the event that any are released casually, or in associating the counters initially. Also it has been sought to provide such elements as will not be awkward to grasp but will readily accommodate themselves to, and feel agreeable in, the hand grasp.

It is a valuable attainment of the invention, therefore, that the perception of numerical values is aided by sense of touch, the bulk of the counters grasped being directly proportional to their number. Thus an association is formed between smaller numbers and smaller handfuls; larger numbers and larger handfuls. These attainments are of very great value in the training of elementary pupils.

My invention will also contribute largely to sense training because of these associations, between number and bulk.

Another advantage of the device lies in the fact that the demonstration of problems may be observed by an entire class. Also, the use of the device by a pupil compels continuous attention and should interest so flag that some of the counters are dropped, this would be an immediate signal to the teacher.

An end attained is the automatic restoration of the counters to initial spaced position when released, so that no time is required for their rearrangement after the completion of a demonstration.

Inasmuch as learning numbers, combinations, etc., is a matter of drill, and drill consists of repetition of an operation with concentrated attention, it will be apparent that this invention will afford a valuable means for insuring the maximum benefit by repetition of operations.

Additional objects and advantages will be apparent, some of which will appear from the following description and from the drawings, in which, Figure 1 is a front view of one embodiment of the invention, Fig. 2 is a similar view showing the device in use, Fig. 3 is a detail of the mounting of the counters, Fig. 4 is a detail of a weight for the counters.

There is illustrated a horizontal guide in the form of a cable 10, which may be supported in any desired manner so that it will maintain as nearly a horizontal position as possible, the means for supporting it not being shown since this is a mechanical detail. The cable may be secured upon a wall, or between two brackets, or standards, of such familiar construction as desired. Upon the cable there are engaged slides 11, each comprising a cylindrical block of any suitable material, having an encircling groove 12 intermediately of its length, in which there is engaged the looped upper end of a counter 13, which may be of any desirable flexible material, but as shown consist of short lengths of cable preferably woven of cotton, the lower ends of which are suitably bound to prevent their fraying. The counters may be of any desired length, but for ordinary use it has been found best to make them about two feet long. The slides 11 are preferably of such length that when in abutment one with another the counters thereon will be spaced two inches, more or less. The groove in the slide may be located at any point in its length.

In practice, the cable 10 is made of such length that a large part of the counters may be separated from the rest for demonstrations without a superfluous number of counters. The cable 10 is also preferably hung at such height that it will be slightly above the head of a pupil of the average height in the class to be taught. This enables the grasping of the counters conveniently, and also makes the grouping of the counters visible to pupils who may be seated at desks some distance removed from the apparatus. The cable may be hung so that the pupil and teacher may stand on one side and the class be located on the other. It may also be located immediately before a blackboard, so that with the counters made of white material they will be readily distinguished. In the event that a portable black board is employed or one spaced from the walls of the room, the counters may be thrown over the top edge of the board when not required. Preferably about 60 of the counters are provided, though the number may be varied to suit requirements.

In use, the operation of addition would be taught, and the combinations 5+4=9, e. g., would be taught, by the pupil or teacher taking in one hand five counters, and in the other four other nearest counters, so that the two groups can be placed together and the sum of the two groups be taught as equal to nine; or can be identified as nine by the pupil himself.

The operation of multiplication would be taught, and the combination 3×5=15, e. g., be taught by counting off and segregating five counters and then the next five counters, and then the next five, in which case five and five are learned as being equal to ten, and this with the addition of five more, to fifteen; or, in short, five counters taken three times equal fifteen counters.

Subtraction would be taught as an operation, and the combination 11−4=7, e. g., be taught, if eleven counters having been segregated, four of these were grasped or held aside from the rest, thus exhibiting a remainder of seven counters untouched.

Division, as an operation, and the combination 12÷4=3, e. g., would be taught if twelve counters segregated from the whole number were grasped or further separated three at a time, e. g., two pupils each grasping three of these in each hand, thus demonstrating a total of four three's in twelve.

Finding a certain part of a number would be taught, and the problem ⅓ of 24=8, e. g., be taught as a combination, if, 24 counters having been segregated, the operator should divide these into three parts as nearly equal as possible, then equalize the groups, and count each to ascertain that such a fractional part of twenty-four is eight.

All the numerical combinations, within the capacity of the apparatus, could thus either be ascertained or illustrated, and all the numerical operations—finding a sum, finding a difference or remainder, finding a certain times a number, finding how many times one number is contained in another, or finding a fractional part of a given number.

In order to hold a number of the counters grouped without being held in the hand, as when the teacher is making a demonstration to the class, and the number of groups to be displayed is greater than two, a spring clip may be employed, such as will be adapted to receive a number of the counters therein.

In Fig. 4, small bodies 17 are provided on the lower ends of the counters, which bodies may serve as weights to cause prompt return of the counters to vertical position when released, or may serve any other purpose for which they are adapted, as well as giving a finished appearance to the apparatus.

It will of course be appreciated that many modifications of the device may be readily conceived, such as the use of chains covered or not with a sleeve of some material; or cylinders of some rigid material employed suspended pivotally or by a flexible connection; and if considered desirable figures may of course, be formed on or adjacent the counters, or other symbols employed therewith for various purposes—all of which I consider within the scope of my invention.

It is not essential that the counters be made slidable, and any other suitable mounting may be employed.

What is claimed is:

1. In apparatus for teaching, a support, and a multiplicity of spaced pendant flexible members thereon, tending to hang in vertical parallel relation.

2. Apparatus for teaching arithmetic comprising a support, an approximately horizontal guide thereon, a plurality of apertured elongated blocks slidably engaged on the guide, each block having an intermediate circumscribing groove, and counter units carried thereby comprising sections of cable each having one end looped around a respective block in the groove, and secured, the other end hanging free.

3. Apparatus of the class described comprising a horizontal support, a plurality of relatively movable sliding elements thereon, pendant cable sections carried by each, a body having central apertures receiving the end of the cable projected therethrough, the body having an enlarged recess at its lower end, and the cable having a knot at its lower end for retention of the body and concealed in the recess.

In testimony whereof I have hereunto set my hand in presence of two subscribing witnesses.

HERMAN G. CUTHBERT.

Witnesses:
 CHRISTIAN R. NIELSEN,
 L. CLOUD NEWMAN.